Feb. 20, 1951   J. W. CLARK   2,542,478
ELECTRIC FIELD MAPPING DEVICE
Filed Dec. 17, 1947
FIG. 1.
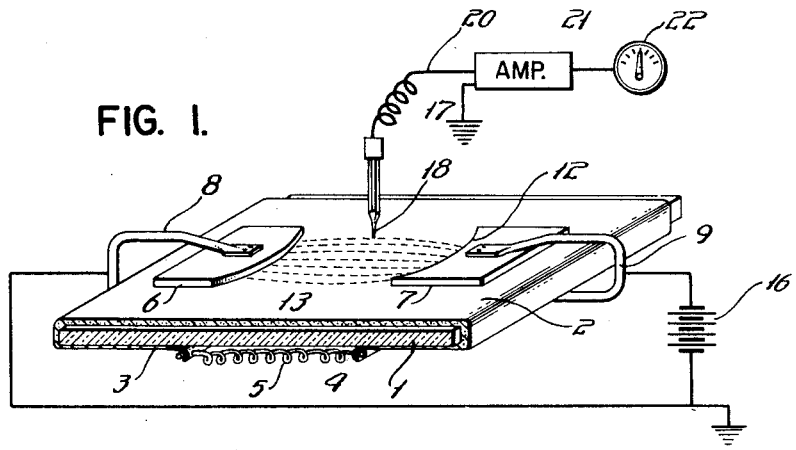
FIG. 2.
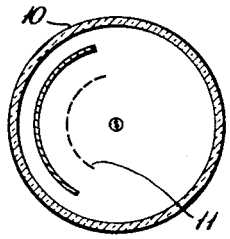
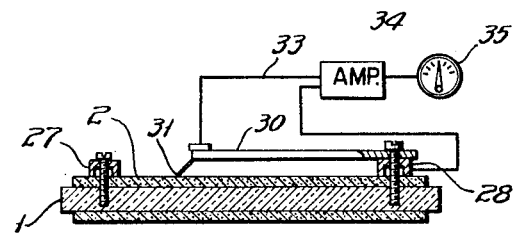
FIG. 6.
FIG. 4.
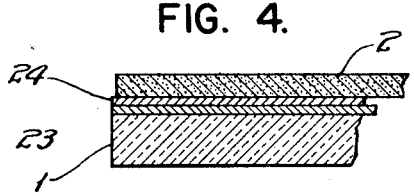
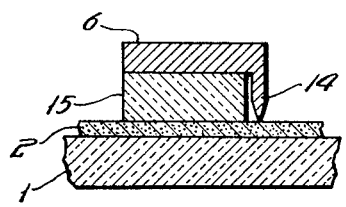
FIG. 3.
FIG. 5.
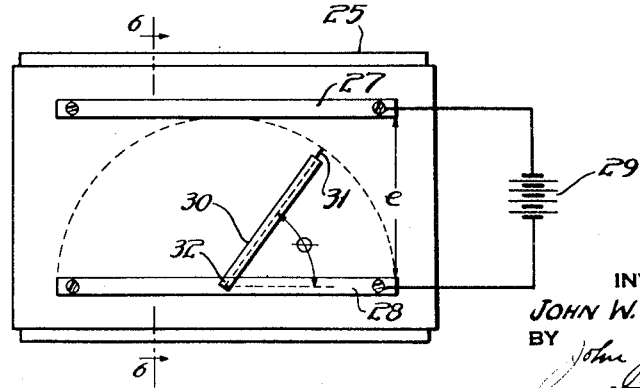
INVENTOR
JOHN W. CLARK
BY John J. Rogan
ATTORNEY Patented Feb. 20, 1951

2,542,478

UNITED STATES PATENT OFFICE 2,542,478

ELECTRIC FIELD MAPPING DEVICE

John W. Clark, Cedar Rapids, Iowa, assignor to Collins Radio Company, Cedar Rapids, Iowa, a corporation of Iowa Application December 17, 1947, Serial No. 792,314

11 Claims. (Cl. 346—74)

This invention relates to electric field mapping devices and more particularly to a device for mapping two dimensional electric fields between spaced electrodes.

A principal object of the invention is to provide an improved device for directly plotting equipotential lines representing a two-dimensional electric field between cooperating electrodes.

Another object is to provide a simplified device for directly producing a voltage which is proportional to any desired angular function of a given angle.

A feature of the invention relates to a two-dimensional electric field mapping device, wherein equipotential lines can be directly produced on a plotting surface over which a test probe is moved.

Another feature relates to a two-dimensional electric field mapping device employing as the mapping medium a sheet or layer of material of predetermined uniform resistivity per unit surface area; and to which are clamped the energized electrodes between which the electric equipotential lines are to be determined.

A further feature relates to the novel organization, arrangement and relative location and interconnection of parts which cooperate to provide an improved electric field mapping device.

In certain of the arts, for example in the art of electron tube design, it is very often necessary to determine the electric field distribution or equipotential lines between various electrodes. Heretofore, the well-known electrolytic tank method has been employed for this purpose. However, in using the tank method, it is first necessary to assemble the electrodes in the desired orientation with respect to the tank and then to take successive readings of electric potentials at various points between the electrodes. When these readings have been obtained, if a permanent visual record is required, it is then necessary to plot and translate the readings into lines on graph paper or the like. This latter step is comparatively laborious and time consuming. Furthermore, the tank method requires a comparatively costly tank assembly which, because of the liquid content, is not always convenient for use. The present invention has all the advantages of the well-known electrolytic tank method of determining equipotential lines, but is free from the above-noted and other disadvantages of the tank method.

In other arts, for example in the automatic direction-finding art, it is sometimes necessary to derive a voltage which is a function of a given angle representing for example the bearing of a distant radio station. The present invention provides a relatively simple and easily manipulated device for producing such a voltage.

In the drawing,

Fig. 1 is a perspective view of a device according to the invention, for determining equipotential lines between spaced electrodes.

Fig. 2 is a sectional view of a typical electron tube, the equipotential lines of which between certain electrodes are to be determined.

Fig. 3 is an enlarged cross-sectional detail of certain parts of Fig. 1.

Fig. 4 is a modification of Fig. 1.

Fig. 5 is a plan view of a device for deriving potentials corresponding to angular functions.

Fig. 6 is a sectional view of Fig. 5, taken along the line 6—6 thereof.

Referring to Fig. 1, the device according to the invention, comprises a rigid backing plate 1, of glass or other suitable dielectric having a smooth surface and around which is tautly drawn a sheet 2 of a specially chosen resistive material having a predetermined uniform resistivity per unit of surface area. This resistivity should be within certain limits, for example between 10,000 and 20,000 ohms per square unit area. Preferably, this resistive material should be in the form of a sheet of pliable material so as to permit it to be drawn taut and flat against the upper surface of plate 1. Thus, one material that has been found to be useful is a conducting rubber cloth, consisting of a rubber sheet in the body of which has been incorporated during the manufacture thereof a finely divided conductive filler such as carbon black, powdered metal and the like. An example of such material is so called "space cloth" manufactured by the U. S. Rubber Company and sold under the trade name "Uskon." The invention of course is not limited to the use of rubber conductive cloth. For example, so-called conductive paper such as is used in telefacsimile recording systems may be employed, examples of which are disclosed in U. S. Patent 2,294,150.

In order to insure that the sheet 2 is in uniform contact with plate 1, the ends 3 and 4 can be united by one or more tension springs 5 which however, should be electrically insulated from the sheet 2. It will be understood that the conducting member 2 need not be made from sheet material, and it may be a thickness or layer of so-called resistance card material such as is used for wave attenuators in electric wave guides. Thus, it may take the form of a thickness of cardboard, or of a layer of dielectric material into the body of which has been previously incorporated, or on to the surface of which has been applied, a conductive material to impart the desired uniform resistivity as above-mentioned. The electrodes 6, 7, which are prototypes of the electrodes between which the equipotential lines are to be determined, are clamped by any suitable clamping means 8, 9, against the sheet 2, it being understood that the electrodes 6, 7, are mounted in spaced relation to correspond with the spacing and orientation of the electrodes of which they are prototypes. Thus, in the design of electron tubes it is sometimes necessary to determine the equipotential lines between certain electrodes, for example between the plate electrode or anode 10 and grid 11 (Fig. 2). Consequently, the electrodes 6 and 7 which are prototypes for the electrodes 10 and 11, have their opposed edges 12, 13, curved or shaped to correspond with the curvature of the counter-part electrodes 10, 11. The spacing between electrodes 6 and 7 need not be the same as the actual spacing between the tube electrodes 10 and 11. For example, they may be spaced a much greater distance, and the energizing voltage which is applied to electrodes 6 and 7, may be correspondingly increased to represent the potential gradient between the electrodes 10 and 11.

Preferably, the electrodes 6 and 7 have their lower surfaces undercut as shown in magnified section in Fig. 3, so to confine the contact with sheet 2 to the cooperating opposed edges of these electrodes. If desired, the edge of each electrode can be undercut to a substantial knife edge 14, and the remainder of the lower surface of each electrode can be insulated from the conductive cloth or sheet 2 by a layer of insulation 15. When the electrodes 6, 7, have thus been properly clamped against sheet 2, they are connected to the D. C. voltage source 16 of predetermined voltage magnitude. A conductive probe 17 having a pointed conductive tip is then held in contact with sheet 2 and is moved across the region between the electrodes 6 and 7 while in contact with the sheet. The probe 17 is coupled for example by a coupling sleeve 19 and conductor 20, to a suitable amplifier 21, which in turn is connected to a suitable indicator 22 by means of which points on sheet 2 having equipotential conditions can be detected as the probe 17 is moved across the region between the electrodes. By reason of the uniform surface resistivity of the sheet 2, each time an equipotential point is found, an additional pressure can be exercised on the probe to produce a dot or impression on the sheet 2, thus providing an instantaneous permanent record on the sheet of the various equipotential points.

It has been found that the probe 17 can take the form of an ordinary lead pencil the lead of which can be either conductively or capacitively coupled to sleeve 19 and thence to the amplifier 21 and device 22, thus facilitating the production of a permanent record point on the record 2 each time an equipotential point is located thereon. If desired, and as shown in Fig. 4, a sheet of ordinary writing paper 23 with a superposed sheet of carbon copying paper 24 with the carbon surface in contact with sheet 23, may be placed between the cloth 2 and glass plate 1. Thus, when an equipotential point is found by the probe 17, a slight additional pressure on the probe will result in a record transfer through the carbon sheet 24 to sheet 23. The probe 17, instead of being an ordinary lead pencil, may be a so-called ball point fountain pen.

Referring to Figs. 5 and 6, there is shown a device for producing a voltage proportional to the sine of any given angle. Such a device is of great utility in the art of automatic navigation and the like, where angular bearings are to be represented by corresponding voltages whose magnitudes are a function of the angle. The device comprises a backing plate 25 of glass or similar dielectric material around which is tautly fastened the sheet 26 of conductive cloth or similar material such as described above for the sheet 2. Fastened in contact with the sheet 2 in any suitable manner, are two parallel metal strips or electrodes 27, 28, across which is connected a suitable voltage from the source 29. Pivotally attached to electrode 28 is an arm 30 of insulation material which carries at its forward end a pointed metal probe 31. The length between the pivot point 32 and the tip of probe 31 is equal to the spacing between the electrodes 27, 28, so that the locus of movement of the probe tip is a curve which is tangent to the edge of electrode 27 as represented by the dotted line curve in Fig. 5.

The probe 31 is connected by conductor 33 of a suitable amplifier 34 and thence to an indicator 35, such as a vacuum tube voltmeter, the return circuit of which is connected to electrode 28. Consequently, the voltage which is indicated on the meter 35 will be (V. sin $\theta$) where V is the voltage of source 29 and $\theta$ is the angle between the electrode 28 and arm 30.

While certain preferred embodiments have been disclosed herein, it will be understood that various changes and modifications may be made without departing from the spirit and scope of the invention.

What is claimed is:

1. Apparatus for plotting the electric field distribution between electrodes, comprising a substantially rigid backing plate, a non-liquid layer of material supported on said plate said material having a predetermined uniform resistivity per unit surface area, a pair of electrodes between which the electric field distribution is to be determined said electrodes being mounted in spaced opposed relation to each other and in contact with said layer, means to apply a known potential to said electrodes, and conductive probe means for tracing and marking on said layer equipotential lines between said electrodes and simultaneously with said tracing.

2. Apparatus for plotting the electric field distribution between electrodes, comprising a substantially rigid backing plate of dielectric material, a sheet of conductive material having substantially uniform resistivity per unit surface area, means to maintain said sheet flat against one face of said backing plate, a pair of electrodes in spaced opposed relation and in contact with said sheet, means to apply a predetermined voltage to said electrodes, and a conductive probe for tracing and simultaneously directly marking on said sheet equipotential points between said electrodes.

3. Apparatus according to claim 2 in which said probe is connected to amplifier and indicator means for determining the location of said equipotential points.

4. Apparatus for plotting the electric field distribution between electrodes, comprising a substantially rigid backing plate of dielectric material, a sheet of conductive cloth having a predetermined electric resistivity per unit surface area, means to fasten a pair of electrodes in spaced opposed relation in contact with said sheet, means to apply a known potential across said electrodes, a conductive probe arranged to contact said sheet and trace thereon equipotential lines, and indicator means connected to said probe to detect when said probe is at an equipotential point on said sheet, said probe having means to mark said sheet at each detected equipotential point simultaneously with said tracing.

5. Apparatus according to claim 4 in which said sheet is of conductive rubberized cloth.

6. Apparatus according to claim 1 in which said probe is in the form of a marking pencil having a conductive point.

7. Apparatus for plotting the electric field distribution between electrodes, comprising a backing plate, a recording blank in contact with said plate, a carbon sheet in transfer contact with said record blank, a layer of conductive cloth in contact with said carbon sheet, a pair of electrodes held in spaced opposed relation with each other and in contact with said cloth, means to apply a known potential across said electrodes, a movable probe for tracing on said cloth equipotential points between electrodes and for simultaneously transferring to said record blank a record of each such equipotential point.

8. Apparatus according to claim 1 in which said electrodes have their surfaces undercut to confine the electrical contact between each electrode and said layer of material to the electrode edges.

9. A device for producing a voltage proportionate to the trigonometric function of a given angle, comprising a member having a surface of predetermined uniform resistivity per unit area, a pair of spaced parallel electrodes fastened to said member, an insulator arm pivotally attached to one of said electrodes, a probe attached to the free end of said arm, said arm being rotatable to an angle with said one of said electrodes equal to said given angle, means to apply a predetermined potential across said electrodes, and a utilization circuit connected to said probe for deriving a voltage determined by the point of contact between the probe and said member according to the angular position of said insulating arm with respect to said one of said electrodes.

10. A device according to claim 9 in which said member comprises a conductive cloth and a backing plate of dielectric material to which said cloth is tautly fastened.

11. An analogue device for determining the electric field distribution between energized elements of an electron discharge device, comprising, a backing plate, a layer of material supported on said plate said material having a predetermined uniform resistivity per unit surface area, a pair of electrodes having surfaces shaped analogously to the shape of said elements of said electron discharge device, means to support said electrodes in spaced opposed relation to each other and in contact with said layer, means to apply a predetermined potential across said electrodes representing the energization of said elements, and conductive probe means for tracing and simultaneously marking directly on said layer equipotential lines between said electrodes.

JOHN W. CLARK.

REFERENCES CITED

The following references are of record in the file of this patent:

UNITED STATES PATENTS

| Number | Name | Date |
|---|---|---|
| 1,825,855 | Graig | Oct. 6, 1931 |
| 2,368,217 | Hayes | Jan. 30, 1945 |

OTHER REFERENCES

Electron Optics—Theoretical and Practical, by Myers. Published by D. Van Nostrand Co., pages 126 to 142 inclusive. (A copy is available in Division 54.)

Text Book: Geophysical Exploration, by Heiland, 1940, chapter 10, section IV, pages 681–706. (The text is available in Div. 48.)